United States Patent [19]

Bodrov et al.

[11] 4,418,530

[45] Dec. 6, 1983

[54] SEWER PLANT FOR COMPRESSOR STATION OF GAS PIPELINE SYSTEM

[75] Inventors: Igor S. Bodrov, Leningrad; Anatoly G. Gudz; Tatyana M. Lukianova, both of Moscow; Vladimir P. Nitskevich, Khimki; Anatoly P. Ogurtsov, Leningrad; Andrei F. Salnikov, Krasnodar; Mikhail M. Fomichev, Krasnodar; Igor V. Sherstobitov, Krasnodar; Mikhail B. Schepakin, Moscow, all of U.S.S.R.

[73] Assignee: Moskovsky Institut Khimicheskogo Mashinostroenia, Moscow, U.S.S.R.

[21] Appl. No.: 149,536

[22] Filed: May 13, 1980

Related U.S. Application Data

[63] Continuation of Ser. No. 860,975, Dec. 15, 1977, abandoned.

[51] Int. Cl.³ .................................................. F02C 6/18
[52] U.S. Cl. .................................. 60/39.181; 60/39.465
[58] Field of Search ........ 60/39.02, 39.18 C, 39.18 R, 60/39.46 G, 39.181

[56] References Cited

U.S. PATENT DOCUMENTS 3,107,482 10/1963 Fono .............................. 60/39.16 R
3,365,121 1/1968 Phillips .......................... 60/39.18 C
3,525,218 8/1970 Buss ................................... 60/39.02

Primary Examiner—Louis J. Casaregola
Attorney, Agent, or Firm—McAulay, Fields, Fisher, Goldstein & Nissen

[57] ABSTRACT

A power plant for a compressor station of a gas pipeline system comprises an electric generator intended to meet the compressor station's power requirements and coupled to the shaft of an expansion engine provided with a collection chamber, the inlet of the expansion engine being connected through a heater to a gas main, whereas the outlet of the expansion engine is connected to the combustion chambers of gas turbine installations. The collector chamber of the expansion engine communicates through a cooler for the medium discharged from that collector chamber with another portion of the gas main. The power plant of this invention can be employed at compressor stations of gas pipeline systems having gas mains operating at the same or different design pressures. The power plant is intended to meet power and fuel gas requirements of a compressor station.

5 Claims, 5 Drawing Figures

4,418,530

SEWER PLANT FOR COMPRESSOR STATION OF GAS PIPELINE SYSTEM

This is a continuation of application Ser. No. 860,975 filed Dec. 15, 1977.

FIELD OF THE INVENTION

The present invention relates to heat-power engineering and, more particularly, to a power plant for a compressor station of a gas pipeline system. The invention can be used to provide power and gas fuel at a predetermined pressure to compressor stations of gas mains under variable operating conditions.

In areas with a mild climate and a ramified network of power transmission lines, power is normally fed to compressor stations of gas pipeline systems from independent external power sources. In areas which are hard to reach and have rigorous climatic and soil conditions, the power source is normally a power station specially built to satisfy the power requirements of a compressor station.

In the latter case the reliability of power supply is primarily determined by the reliability of the equipment used at the power station.

Experience shows that heat engines currently used at compressor stations cannot fully meet the increasingly stringent requirements imposed on them.

STATEMENT OF THE PRIOR ART

There is known a power plant for a compressor station of a pipeline system. In this power plant, a rotatable reducer (for example, an expansion turbine) is connected through a heater to a gas main and is also coupled by means of a shaft to an electric generator. The outlet of the expansion engine is connected to the combustion chamber of a gas turbine installation which powers the compressor.

The most serious disadvantage of the foregoing type of power plant is the fact that with constant thermodynamic parameters, the capacity of the electric generator mounted on the same shaft with the expansion engine is determined by the amount of fuel gas consumed at the compressor station. This means that in case of an emergency limitation or a complete stop of fuel gas consumption the compressor station is left without power. The use of standby power plants in such situations involves considerable difficulties for the personnel. Furthermore, standby power plants are not fully reliable in situations like those mentioned above and for that reason are hardly ever used at compressor stations.

OBJECTS AND SUMMARY OF THE INVENTION

It is an object of the present invention to provide a highly reliable and completely independent power supply system for a compressor station to fully meet the power requirements of the compressor station regardless of the letter's operating conditions.

The foregoing object is attained by providing a power plant for a compressor station of a gas pipeline system with gas mains operating at the same or different design pressure and gas pumping units, including gas compressors and combustion chambers of gas turbine installations, such as gas turbine installations of the MS 3002 type manufactured by General Electric and referred to in the present specification, comprising an electric generator coupled by means of a shaft to an expansion engine having a collection chamber, the inlet of the expansion engine being connected through a heater to the gas main, whereas its outlet connected to the combustion chambers of the gas turbine installations, wherein the collection chamber of the expansion engine is connected, according to the invention, through a cooler to another portion of the gas main.

It is preferred that the inlet of the expansion engine be connected through a heater to the outlet of a high pressure compressor, whereas the collection chamber of the expansion engine be connected through a cooler to the outlet of a low pressure compressor.

It is also preferred that the inlet of the expansion engine be connected through a heater to the outlet of the high pressure compressor, whereas the collection chamber of the expansion engine be connected through a cooler to the inlet of the low pressure compressor of the inlet of the high pressure compressor.

The inlet of the expansion engine may be connected through a heater to the inlet of the high pressure compressor, whereas the collection chamber of the expansion engine is connected through a cooler to the inlet of the low pressure compressor.

The use of the proposed power plant is more effective than the existing methods of supplying power to compressor station, because the proposed power plant is more economical thermodynamically than the conventional systems and incorporates simpler units.

The power plant of this invention effectively meets the power requirements of a compressor station irrespective of the latter's operating conditions due to the fact that in case of a limitation or complete stop of fuel gas consumption at the compressor station, the amount of power required for operation of the compressor station will be produced to the flow of gas directed from the collection chamber to the main.

BRIEF DESCRIPTION OF THE DRAWINGS

Other objects and advantages of the present invention will be better understood from the following detailed description of preferred embodiments thereof to be read in conjunction with the accompanying drawings, wherein.

DISCLOSURE OF BEST MODE OF THE INVENTION

Figure 1:
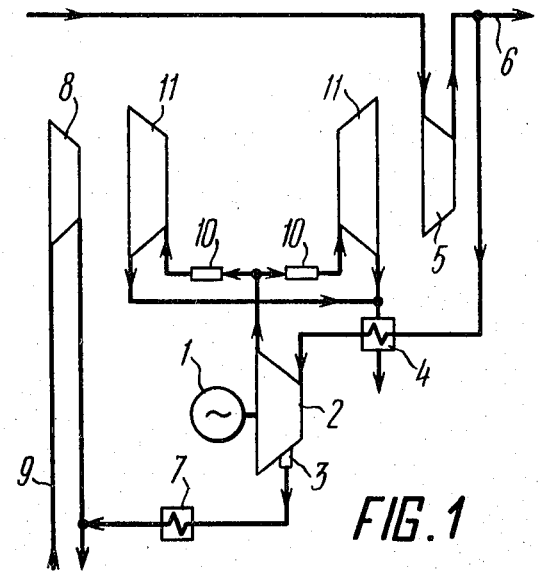
FIG. 1 is a schematic representation of a power plant, wherein the inlet of the expansion engine is connected to the outlet of the high pressure compressor, while the collection chamber is connected to the outlet of the low pressure compressor, in accordance with the invention.

There is shown in FIG. 1 is a schematic representation of a power plant which comprises an electric generator 1 intended to meet the power requirements of the compressor station and coupled to the shaft of an expansion engine 2 provided with a collection chamber 3. The inlet of the expansion engine 2 is connected through a heater 4 to the outlet of a compressor 5 of a high pressure gas main 6. The collection chamber 3 is connected through a cooler 7 to the outlet of a compressor 8 of a low pressure gas line 9. The outlet of the expansion engine 2 is connected to combustion chambers 10 of gas turbine installations 11 which power the compressors 5 and 8, respectively.

Figure 2:
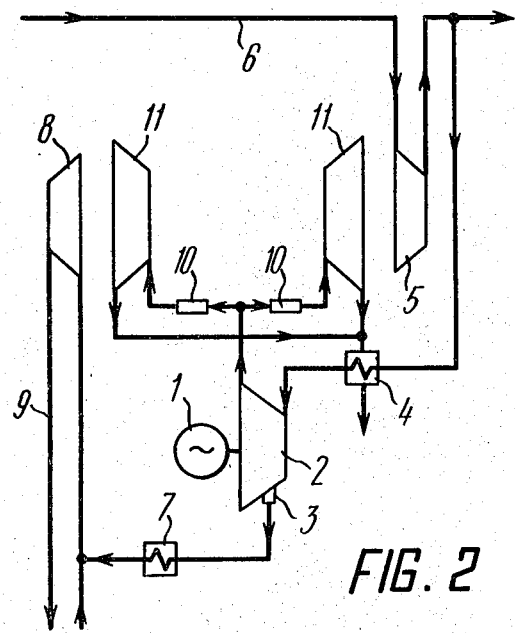
FIG. 2 is a schematic representation of a power plant, wherein the inlet of the expansion engine is connected to the outlet of the high pressure compressor, while the collection chamber is connected to the inlet of the low pressure compressor, in accordance with the invention.

FIG. 2 is a schematic representation of a power plant, wherein the inlet of the expansion engine 2 is connected through the heater 4 to the outlet of the compressor 5 of the high pressure gas main 6, whereas the collection chamber 3 is connected through the cooler 7 to the inlet of the compressor 8 of the low pressure gas line 9. The outlet of the expansion engine 2 is also connected to the combustion chambers 10 of the gas turbine installations 11 which power the compressors 5 and 8.

Figure 3:
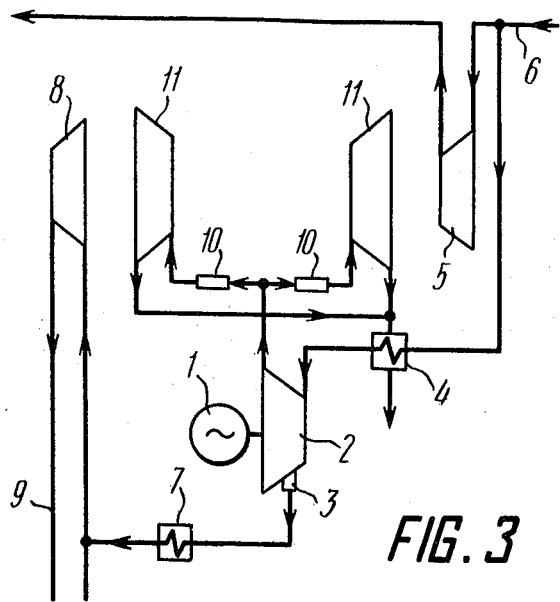
FIG. 3 is a schematic representation of a power plant, wherein the inlet of the expansion engine is connected to the inlet of the high pressure compressor, while the collection chamber is connected to the input of the low pressure compressor, in accordance with the invention.

FIG. 3 is a schematic representation of a power plant, wherein the inlet of the expansion engine 2 is connected through the heater 4 to the inlet of the compressor 5 of the high pressure gas main 6, whereas the collection chamber 3 is connected through the cooler 7 to the inlet of the compressor 8 of the low pressure gas line 9. The outlet of the expansion engine 2 is also connected to the combustion chambers 10 of the gas turbine installations 11 which power the compressors 5 and 8.

Figure 4:
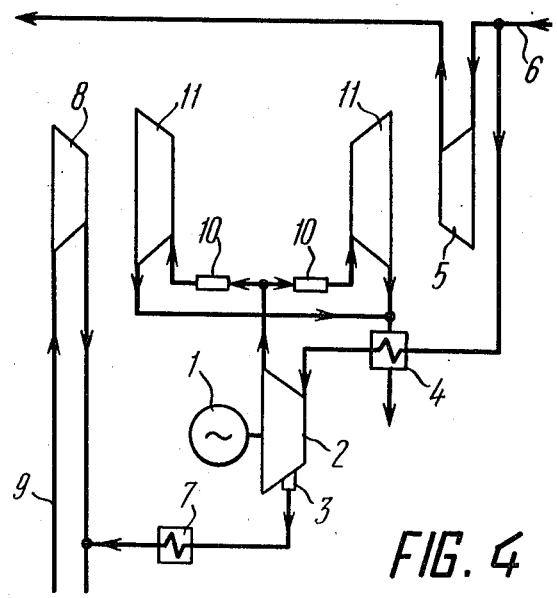
FIG. 4 is a schematic representation of a power plant, wherein the inlet of the expansion engine is connected to the inlet of the high pressure compressor, whereas the collection chamber is connected to the outlet of the low pressure compressor, in accordance with the invention.

FIG. 4 is a schematic representation of a power plant, wherein the inlet of the expansion engine 2 is connected through the heater 4 to the inlet of the compressor 5 of the high pressure gas main 6, whereas the collection chamber 3 is connected through the cooler 7 to the outlet of the compressor 8 of the low pressure gas line 9. The outlet of the expansion engine 2 is also connected to the combustion chambers 10 of the gas turbine installations 11 which power the compressors 5 and 8.

FIGS. 1 through 4 refer to gas mains with different design pressures. In case the gas mains all have the same design pressure as shown in FIG. 5, the inlet of the expansion engine 2 is connected through the heater 4 to the outlet of the compressor 5 of the gas main 6, whereas the collection chamber 3 is connected through the cooler 7 to the inlet of the compressor 5 of the gas main 6.

The operating principle of the embodiments shown in FIGS. 1 through 5 is as follows. Gas is directed from the gas main 6 to the expansion engine 2 (the gas flow is shown by arrows in FIGS. 1 through 5). The gas is heated by the heater 4 which uses the heat of exhaust gases of the gas turbine installations 11 which power the compressors 5 and 8. In the expansion engine 2 the fuel gas expands to reach a pressure which has to be maintained upstream of the combustion chambers 10 of the gas turbine installations 11 and performs work. As a results, the electric generator 1, coupled to the shaft of the expansion engine 2, produces electric energy.

In a situation when a reduced consumption of fuel gas leads to a shortage of power, an additional amount of power can be produced by using an additional flow of gas directed from the gas main 6 through the heater 4 to the expansion engine 2 (the gas flow is indicated by arrows in FIGS. 1 through 5), whereupon the gas is directed from the collection chamber 3 through the cooler 7 to the gas line 9 (this gas flow is shown by arrows in FIGS. 1 through 4).

Figure 5:
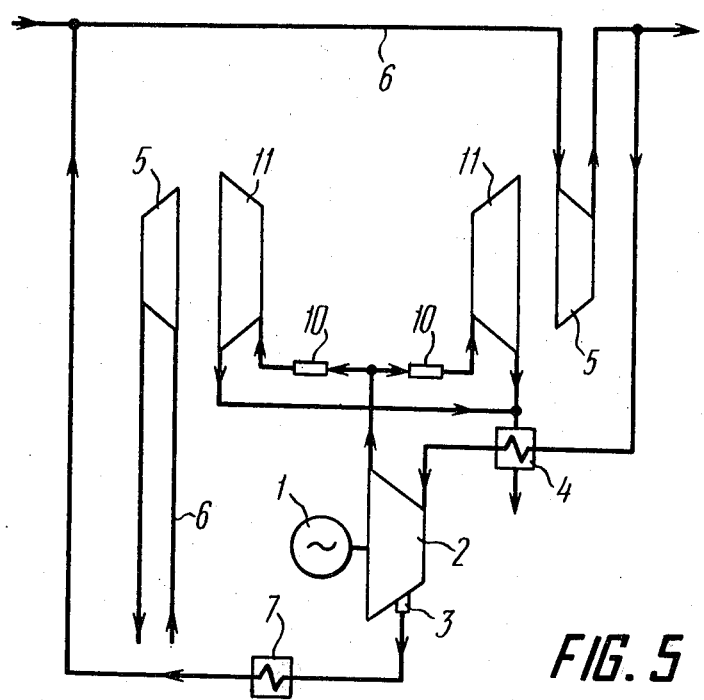
FIG. 5 is a schematic representation of a power plant, wherein the inlet of the expansion engine is connected to the outlet of the compressor, whereas the collection chamber is connected to the inlet of the compressor.

If the gas pipeline system comprises gas mains operating at the same design pressure, gas from the collection chamber is directed to the cooler 7 and proceeds to the inlet of the compressor 5 to be further directed to the gas main 6 (the gas flow is shown by the arrow in FIG. 5).

What is claimed is:

1. A power plant for a compressor station of a gas pipeline system having gas forcing devices including both a high pressure compressor in a high pressure gas main and an additional low pressure compressor in an additional low pressure gas main, the gas compressed by said high pressure compressor being brought into said high pressure gas main at a pressure higher than the pressure produced by said low pressure compressor, and gas turbine installations having combustion chambers, said power plant comprising:

an electric generator intended to meet the power requirements of said compressor station;

an expansion engine having a collection chamber provided with a discharge package and coupled with the shaft of said electric generator;

a heater for heating the gas directed to said expansion engine;

said expansion engine having an intake passage coupled through said heater with a point in said high pressure main, and having a discharge passage coupled with said combustion chambers of the gas turbine installations;

a gas cooler coupled with said discharge passage of said collection chamber for cooling the flowing gas therein; and said collection chamber being coupled through said gas cooler with said additional low pressure gas main at a point where the pressure is lower than at said point of said high pressure main which is coupled with said intake passage of said expansion engine whereby expansion engine is capable of utilizing a pressure differential between said high and said low pressure mains to thus insure that the power plant remains operational in the event that said low pressure compressor is shutdown.

2. A power plant as claimed in claim 1, wherein said intake passage of said expansion engine is connected through said heater to said high pressure gas main downstream of said high pressure compressor, and said collection chamber is connected through said cooler to said low pressure gas main downstream of said low pressure compressor.

3. A power plant as claimed in claim 1, wherein said intake passage of said expansion engine is connected through said heater to said high pressure main downstream of said high pressure compressor, and said collection chamber is connected through said cooler to said low pressure main upstream of said low pressure compressor.

4. A power plant as claimed in claim 1, wherein said intake passage of said expansion engine is connected through said heater to said high pressure main upstream of said high pressure compressor, and said collection chamber is connected through said cooler to the low pressure main upstream of said low pressure compressor.

5. A power plant as claimed in claim 1, wherein said intake passage of said expansion engine is connected through said heater to said high pressure gas main upstream of said high pressure compressor, and said collection chamber is connected through said cooler to the low pressure gas main downstream of said low pressure compressor.

* * * * *